No. 642,438. Patented Jan. 30, 1900.
S. FYFE.
CAN LABELING MACHINE.
(Application filed July 16, 1898.)
(No Model.) 7 Sheets—Sheet 1.

Witnesses. Inventor.
Samuel Fyfe.
By James L. Norris
Atty.

THE NORRIS PETERS CO., PHOTO-LITHO., WASHINGTON, D. C.

No. 642,438. Patented Jan. 30, 1900.
S. FYFE.
CAN LABELING MACHINE.
(Application filed July 16, 1898.)
(No Model.) 7 Sheets—Sheet 2.

No. 642,438. Patented Jan. 30, 1900.
S. FYFE.
CAN LABELING MACHINE.
(Application filed July 16, 1898.)
(No Model.) 7 Sheets—Sheet 4.

Fig. 3ª

No. 642,438. Patented Jan. 30, 1900.
S. FYFE.
CAN LABELING MACHINE.
(Application filed July 16, 1898.)
(No Model.) 7 Sheets—Sheet 5.

Witnesses.
Inventor.
Samuel Fyfe.
By
James L. Norris
Atty.

No. 642,438. Patented Jan. 30, 1900.
S. FYFE.
CAN LABELING MACHINE.
(Application filed July 16, 1898.)
(No Model.) 7 Sheets—Sheet 6.

Fig. 7

Witnesses. Inventor.
Samuel Fyfe
By
James L. Norris
Att'y.

No. 642,438. Patented Jan. 30, 1900.
S. FYFE.
CAN LABELING MACHINE.
(Application filed July 16, 1898.)
(No Model.) 7 Sheets—Sheet 7.

Witnesses. Inventor.
Samuel Fyfe.
By James L. Norris
Atty.

UNITED STATES PATENT OFFICE.

SAMUEL FYFE, OF PORT MELBOURNE, VICTORIA, ASSIGNOR OF TWENTY-ONE FORTIETHS TO WALTER CHAMBERLAIN PEACOCK, OF MELBOURNE, VICTORIA.

CAN-LABELING MACHINE.

SPECIFICATION forming part of Letters Patent No. 642,438, dated January 30, 1900.

Application filed July 16, 1898. Serial No. 686,125. (No model.)

*To all whom it may concern:*

Be it known that I, SAMUEL FYFE, plumber and gas-fitter, a subject of the Queen of Great Britain, residing at No. 46 Nott street, Port Melbourne, in the British Colony of Victoria, have invented an Improved Machine for Labeling and Wrapping Tins and other Vessels, (for which I applied for a patent in Victoria on the 8th day of March, 1898, No. 15,021,) of which the following is a specification.

This invention is specially adapted for labeling and wrapping cylindrical tins, such as jam and meat tins, but is also applicable for labeling and wrapping other descriptions of vessels.

In order that the invention may be easily understood, reference will be made to the accompanying drawings, in which—

Figure 1 is a plan, and Fig. 2 a longitudinal central section, of a labeling and wrapping machine embodying this invention. Fig. $2^a$ is a vertical transverse section on line $2^a$ $2^a$, Fig. 1.

The same letters of reference are used to indicate the same or similar parts throughout the drawings.

According to this invention the tins or other vessels to be labeled are fed onto an incline A at one end of the machine, so that they will roll down either upon said incline or upon rails $a$ at the side and will pass over a roller B, (see Figs. 3 and 4,) mounted over a shallow trough $b$, containing some adhesive material. This roller is carried on pivoted arms $b'$ and is depressed, as indicated by dotted lines in Fig. 3, on the passage of the tin or other vessel over it. It is also mounted on said arms in such a way that it can partially rotate as each tin or other vessel passes over it, the effect being to apply a certain quantity of adhesive material to each tin and at the same time insure the partial rotation of the roller B at each operation.

Figure 3:
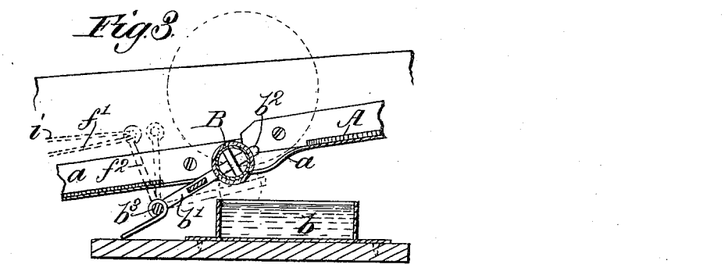
Fig. 3 is a vertical longitudinal section through the adhesive-containing trough and the roller operating in conjunction therewith. Fig. $3^a$ is an enlarged sectional detail of the paste-roller and its wires for removing the surplus paste therefrom.
Figure 3A:
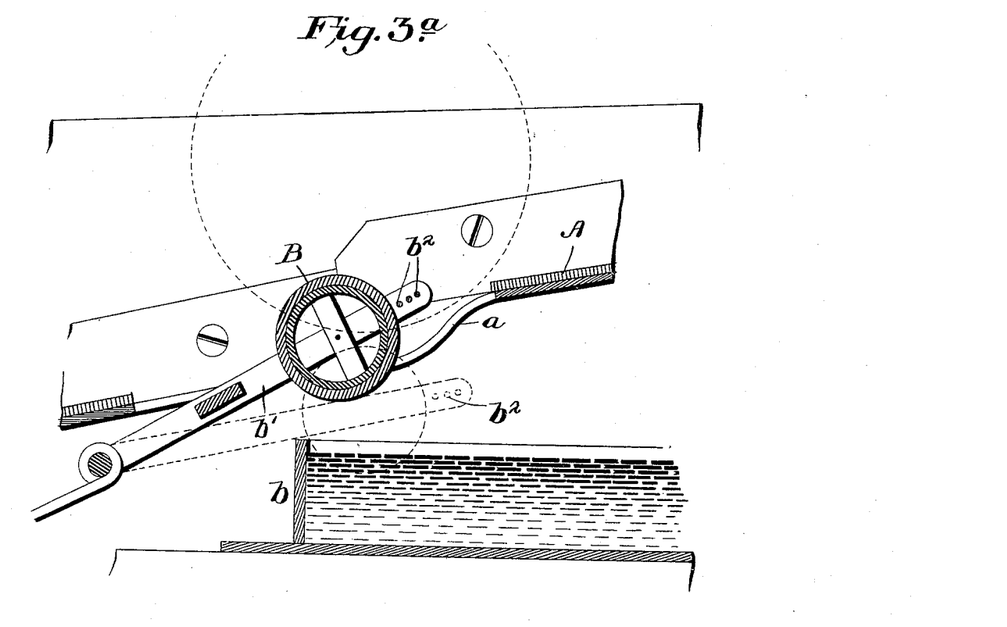
Figure 4:
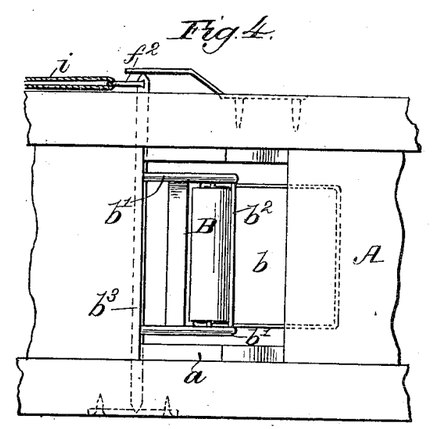
Fig. 4 is a top plan of Fig. 3.

When a very thick adhesive material is used, it is necessary to arrange three or more fine wires $b^2$ between the ends of the arms $b'$, so that they will extend across parallel to and a short distance away from the roller B in order to cut off any superfluous material adhering to it. These wires are arranged a short distance from each other, and they effectually remove any superfluous material from the roller without unduly hindering its rotation.

Special importance is attached to the plurality of fine wires $b^2$, as I have found from experience that a single large wire or scraper will not effectually serve in this connection, first, because the roller being connected by a light empty can and not by extraneous power it is necessary that the accessories should be as light as possible, and, furthermore, with a single thick wire the paste will so adhere to the roller and wire as to clog and prevent rotation of the roller. The series of fine wires serve effectually in that they serve to cut the paste, which can escape between the wires, which latter are drawn, as it were, toward the roller, and besides being light they will remove all surplusage of paste and allow the roller to revolve freely.

The labels C to be applied to the tins or other similar vessels are placed one upon the other on a counterbalanced vertically-adjustable holder or support D, (see Figs. 2 and 5,) set at such a distance in front of the roller B that the tin will make one complete revolution before bringing the part of said tin to which the adhesive composition has been applied onto the end of the uppermost one of the pile of labels. The opposite ends of these labels C are placed underneath a wire E, which is mounted in bearings at each end and extends across the machine and from underneath which the ends of said labels are withdrawn one at a time by the forward travel of the tin or other vessel. This wire is as small as possible consistent with the required strength or stiffness, so that it will, in conjunction with the support D, bend the end of the label upward or inward, as indicated at $c^2$ in Fig. 6, and so counteracts the tendency to curl in the opposite direction, thus effectually closing the seam of the label with cleanness and precision on the next revolution of the tin. This result is of paramount importance, especially with heavy glazed labels, and in order to make more certain of obtaining it the upper surface of the label-carrying holder or support D is made with a double incline, one, $d$, being downward and extending nearly to said wire and the other, $d'$, being upward and extending under said wire, so as to accentuate the bend imparted to the end of the label upon its withdrawal. The incline $d'$ depends upon the angle at which the labels are drawn from under the wire E, it being necessary (especially with heavy labels) to bend their ends back to an angle of about ninety degrees in order to impart the desired inward curve to them. By constructing the support D with the double inclines $d\ d'$ the label hangs slack while being rolled around the tin and will be jerked from under the wire E when the rolling tin or other vessel has passed the position indicated in Fig. 5. At this stage the front end of the label is gripped between the tin and the track. This portion of the track (see Fig. 5) may be covered with rubber or other suitable material to assist in more securely gripping the front edge of the label, which is therefore prevented from being drawn off the tin by the strain.

It is necessary that a certain amount of slack be left in the label as it is being rolled around the tin, because the tins are larger at their ends than their bodies, the tendency being to overrun and so draw the label off the tin before it is drawn from under the wire.

The forward end of the label-carrying holder or support D bears against inclined guides $d^2$, (see Fig. 5,) while its rear end is attached to and is drawn upward by a weighted cord $d^3$, passing over a spindle or pulley $d^4$, as shown, thus raising the remainder of the pile of labels as each one is withdrawn. One or more small spring-catches $d^5$ are mounted upon the main frame of the machine on each side of the label-holder D and are so constructed and arranged that their front edges bear against and cut slightly into the edges of the labels, and thus prevent more than one label at a time being drawn back from under the wire E.

Figures 5, 6:
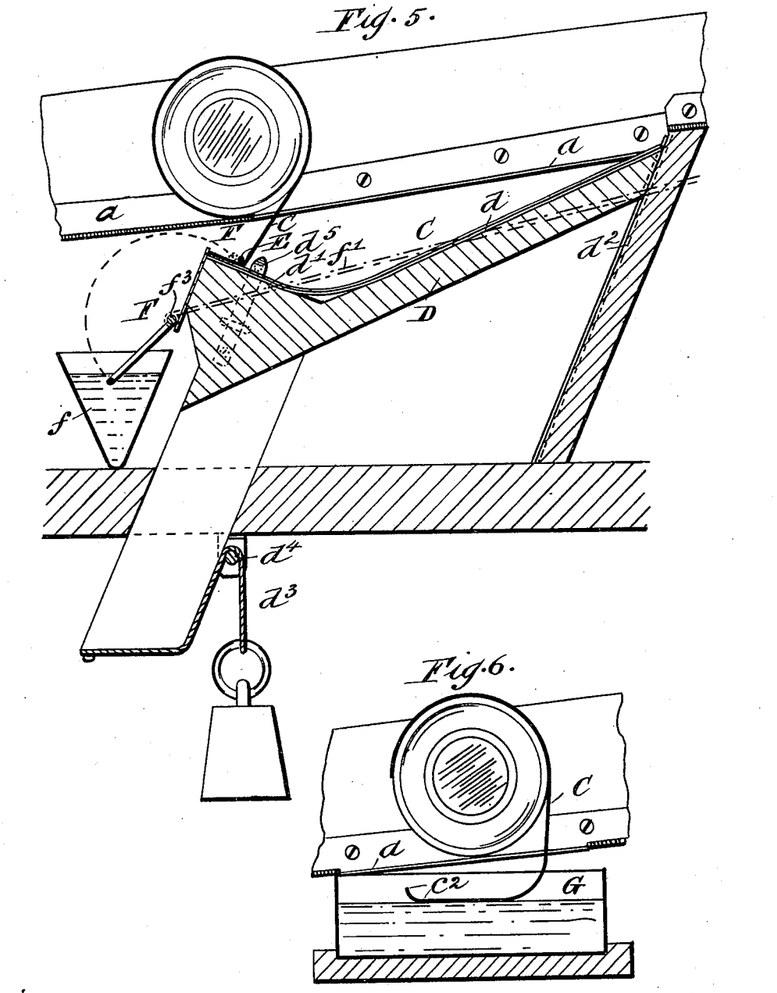
Fig. 5 is an enlarged vertical longitudinal section through the counterbalanced support for the labels.
Fig. 6 is an enlarged section through the water-tank.

Before a label is withdrawn, as just described, a pivoted paste-carrier F, consisting by preference of a bent wire, is moved, as indicated by dotted lines in Fig. 5, so as to convey a portion of paste from a suitably-arranged paste dish or pot $f$ onto the edge of the label. This pasting contrivance may be actuated by the depression of the roller B, a cord $f'$ being led from an arm $f^2$ (see Fig. 3) on the rocking spindle $b^3$ of said roller B and being passed around the spindle $f^3$ of the paste-carrier F. This insures said paste-carrier being operated each time that the roller B is depressed by a vessel passing over it. A small spring $f^4$, Fig. 1, coiled around the spindle $f^3$, serves to return said paste-carrier F to its normal position as soon as the vessel has passed over the roller B. The paste will be spread evenly over the edge of said label as the latter is drawn from under the wire E, and the adhesion of this end of the label to the other part is insured by the weight of the tin itself rolling over the joint, thereby completing the operation of securing a label around the tin, which may then be removed from the machine.

Figure 7:
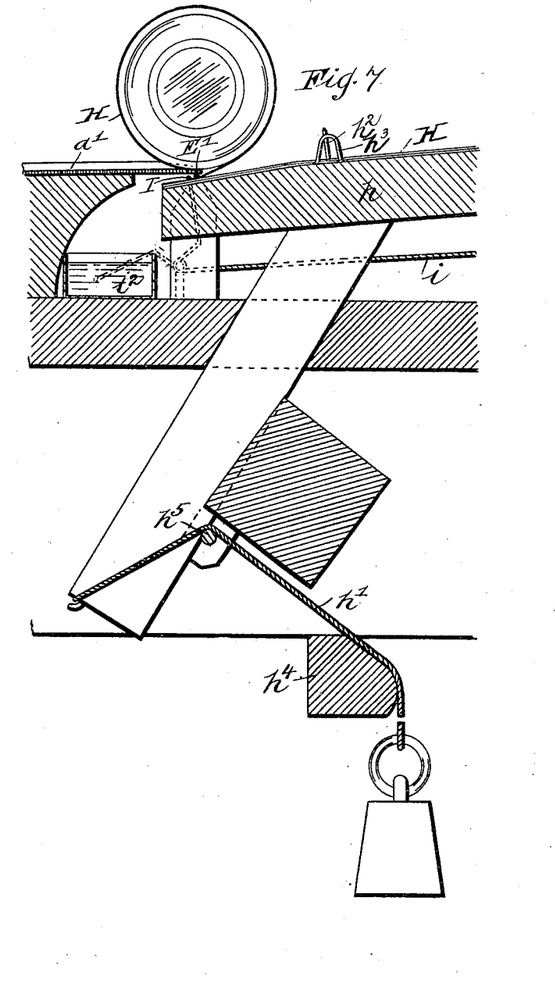
Fig. 7 is an enlarged vertical longitudinal section through the wrapper-support and the paste-carrier.
Figure 8:
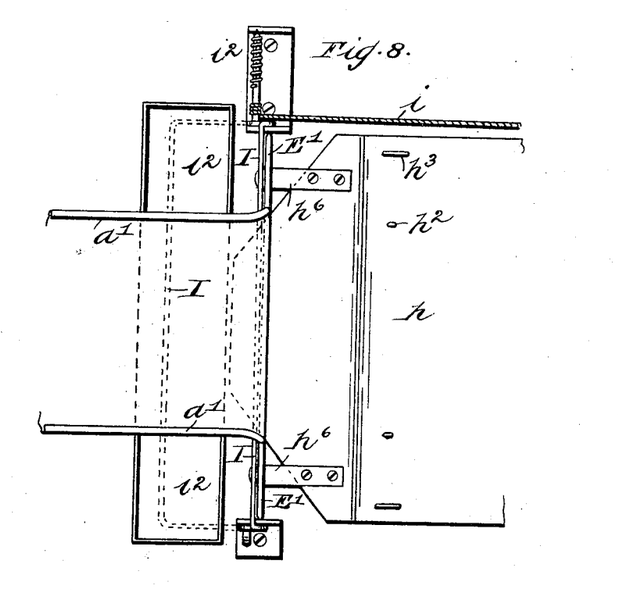
Fig. 8 is a top plan thereof.
Figure 9:
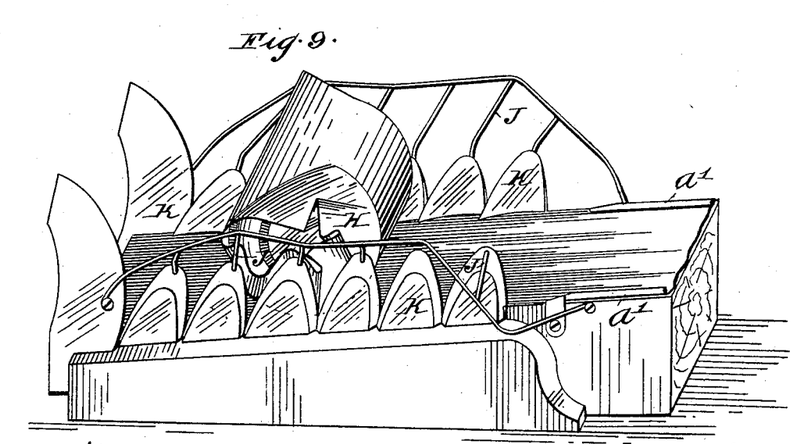
Fig. 9 is a perspective detail showing the means for turning in the wrapper at the ends of the can.

If in addition to fixing a label around the tin it is also desired to secure an external wrapper around it, then the tin is allowed to continue rolling down the track, and when it has almost made another revolution since passing over the wire E it travels over a small tank G containing water. At this stage one end of the label will be loose—that is, it will not have been pressed down onto and thus have been caused to adhere to the tin. Therefore as said tin travels over the tank G said loose label end will be flapped onto the surface of the water, as indicated in Fig. 6, and its under or outer side will be moistened. Instead of this arrangement the tin or other vessel might be run bodily through a small supply of water. In any case the use of water in this way is of paramount importance, as it enables delicate wrappers or labels to be picked up without injury and afterward admits of said wrappers being removed without defacing the labels. On the next revolution of the tin or other vessel the wetted end of the label comes in contact with a wrapper H, the effect of which is that said wrapper adheres to it and is picked up and rolled around the tin at the same time that the pasted end of the label is pressed onto and caused to adhere to the tin. The wrappers H are (like the labels C) supported upon a vertically-adjustable carrier $h$, held in its raised position by means of a weighted cord $h'$, and if found necessary the wrappers may be retained in position upon the carrier by the use of inclined upwardly-projecting pins $h^2$ and stops $h^3$ or other equivalent devices. The cord $h'$ after passing over a spindle or roller $h^5$ is passed over a fixed bar or other support $h^4$, which enables the label to be supported by a slightly-overbalanced weight. By this means a lighter weight can be used on the cord $h'$ to resist the downward motion of the support $h$ when a heavy tin is passing over it, while, on the other hand, the effect of the weight in raising said support upward will be reduced, so that it will not grip the ends of the wrappers too tightly. Provision is made for applying paste or other adhesive material to the rear edges of the wrappers H before they are individually withdrawn from under the wire E'. For this purpose a similar contrivance to that used for pasting the labels may be used. This, as illustrated in Figs. 7 and 8, comprises a pivoted paste-carrier I, operated by a cord $i$ from the arm $f^2$ of the roller B, a spiral spring $i'$ being used for the purpose of returning the paste-carrier to its normal position. $i^2$ represents a trough or dish containing the supply of paste or other adhesive material. The wrappers are not shown in Fig. 8 in order that the supporting-springs $h^6$ may be seen. These are for the purpose of compensating for any bend in the wire E' by allowing the support $h$ to rise in the center. When the tin or other vessel has made another revolution between low guide-rails $a'$, the wrapper will be bound around it, with a portion projecting at each end. These projecting ends require to be folded inward neatly in order to complete the operation. This is effected by causing the tin or other vessel to roll, as indicated in Fig. 9, between a set of folding-wires J, arranged at intervals, as shown, so as to allot or measure the quantity in each fold, which is then immediately engaged by the finger K, supporting said wire, and is thereby turned neatly in. In this way when the tin or other similar vessel reaches the end of the machine it will have a wrapper as well as a label, secured around it, and the wrapper will be turned in neatly over the ends of the tin or other vessel, which will then be ready to be packed in cases or the like.

In the case of conical tins or vessels—that is, those made larger at one end than the other—the inclined race or track down which they run must be curved instead of straight, as will be well understood.

Figures 1, 2A:
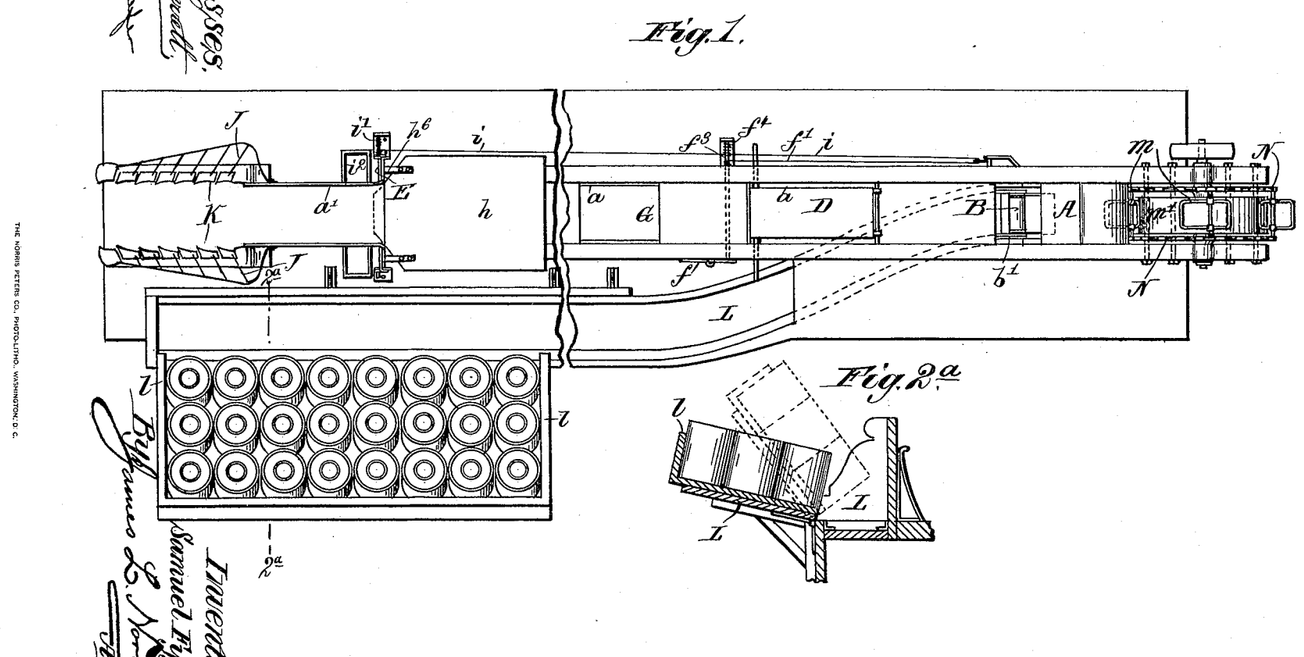
Figure 2:
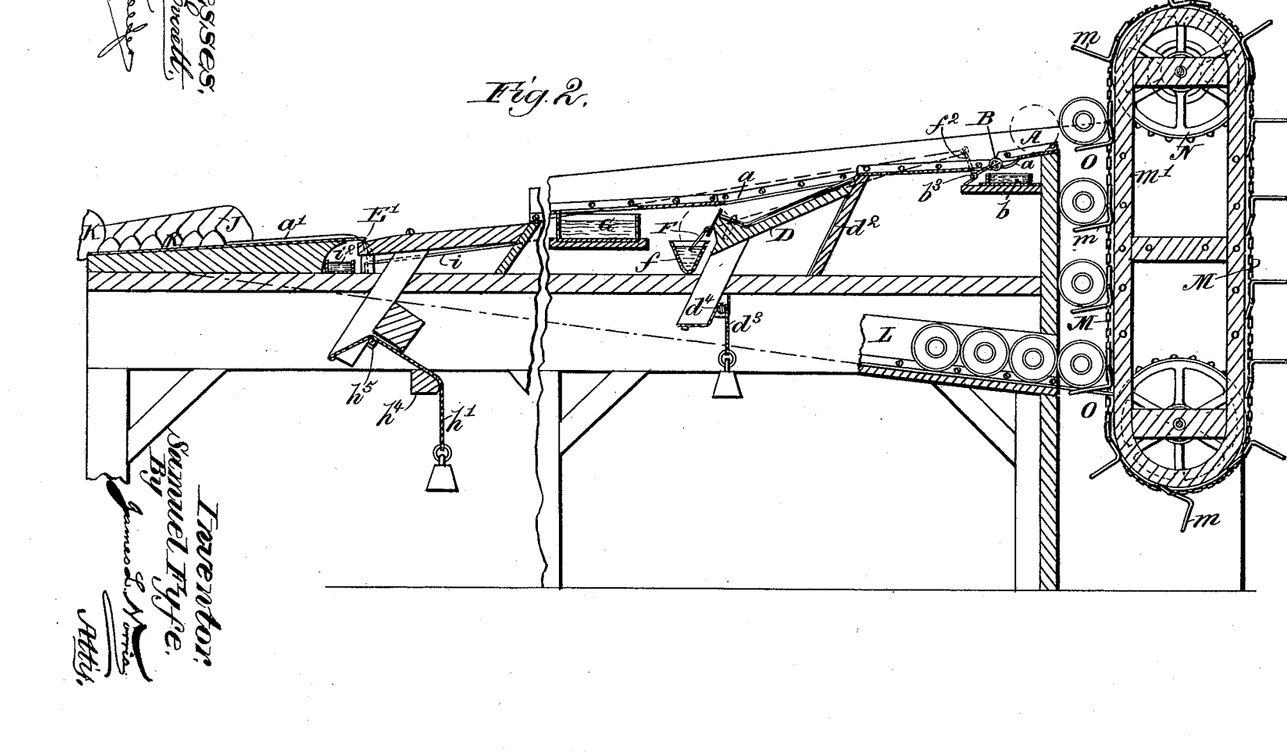

It will be readily understood that the tins or other vessels may be fed onto the incline A by hand or in any other convenient manner. One device for this purpose is shown in Figs. 1, 2, and 2ª. It consists of an inclined race L, leading from near the delivery end of the machine back to underneath the opposite end. A slightly-inclined table or other support L' is hinged to the bottom of the race L at its upper end in order that trays $l$, containing the tins to be labeled, may be placed upon it. These trays are formed without any front side, so that when one has been placed upon said hinged table it may be turned over, and thus caused to discharge its contents onto the upper end of the race L. The tins will then roll down said race to its lower end and will be taken up one at a time by means of an endless traveling carrier or elevator M, consisting of lengths of chain passing over pulleys N N', arranged one above the level of the top of the machine and one below the level of the bottom of the race or track L. These endless chains are fitted with pivoted projecting brackets or supports $m$, adapted to project underneath the tins and slightly inclined downward, so that each of said brackets will raise a tin up the passage O, and when it reaches the incline A will discharge it and start it rolling down said incline.

Suitable guides $m'$ are provided for the lower edges of the projecting brackets $m$ to bear against on their upward travel. Either of the wheels N or N' may be rotated at any desired rate of speed by means of a belt or cord leading from any convenient source of motive power, as will be readily understood. With this arrangement of feeder trays full of tins may be placed in the machine and will afterward be automatically delivered one at a time onto the labeling and wrapping platform.

Figure 10:
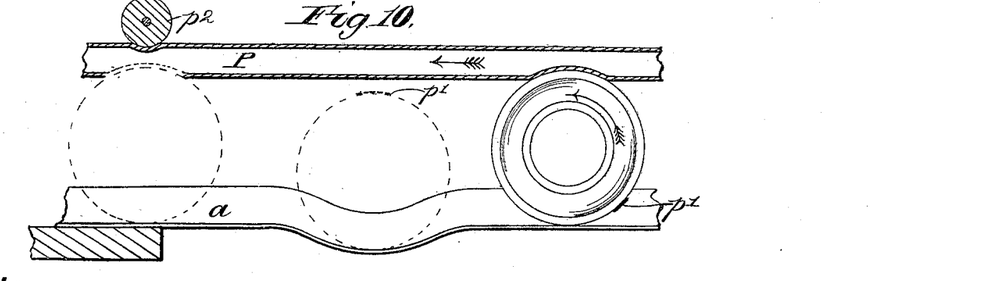
Fig. 10 is a sectional diagram showing a modification which can be used where light tins are to be labeled or wrapped.

In the case of light tins being labeled it might be necessary to provide means for holding them down to their work. For this purpose an endless pneumatic belt P, passing around rollers at each end of the machine, might be used, as indicated in Fig. 10, the guides or platform upon which the tin rests being depressed in those places—as, for instance, at $p$—where otherwise the adhesive composition (indicated at $p'$) might contact with said belt. Guide-rollers, as $p^2$, are mounted so that they bear upon the belt P wherever any special pressure has to be put upon the tin—as, for instance, where it has to pick up a label. A pneumatic belt allows the tin or other vessel to embed itself slightly, as shown, and thus insures the tin being carried along.

The various parts of the machine above described might, if preferred, be made adjustable to suit different sizes of tins or other vessels, although in practice it will probably be found advisable to construct a different machine for each-sized tin or other vessel to be labeled.

In the case of tins having removable lids, where the label is required to be stuck around the edge of the tin, a piece of sponge or other absorbent material projecting from a trough containing paste might be arranged to contact with said edge, as will be well understood.

The various receptacles for containing water, adhesive material, or other liquids may be automatically kept full on the same principle as the ordinary automatic supply drinking-fountains.

Having now particularly described and ascertained the nature of my said invention and in what manner the same is to be performed, I declare that what I claim is—

1. In a labeling-machine the combination of a label-support having its upper face upon two inclines with the forward end rigid and means near the upper end of the forward incline for bending the end of a label backward or inward, as and for the purpose specified.

2. In a labeling-machine a label-support provided at its forward end with an upward incline and means adjacent to the upper end of said incline for pressing upon and holding the end of a label and automatically bending the same backward at an angle as it is withdrawn from such means, substantially as described.

3. In a labeling-machine a label-support with its upper face upon two oppositely-disposed inclines and provided near the upper end of the forward incline with a device, extending transversely thereof and arranged at an angle to bend the end of the label at an angle of substantially ninety degrees as it is withdrawn from beneath such device, as and for the purpose set forth.

4. In a labeling-machine a label-support having its upper face upon two oppositely-disposed inclines and having near the upper end of its forward incline a wire extending transversely of the length of the support and arranged at an angle to bend the end of the label backward or inward at an angle of substantially ninety degrees as the label is withdrawn from under the wire, as set forth.

5. In a labeling-machine, the combination with an adjustable counterbalanced label-support with its upper face upon two oppositely-disposed inclines, of means near the upper end of the forward incline for holding the end of a label and bending the same at an angle as it is withdrawn from under such means, as set forth 6. The combination with a support with guides for the can, of a pivotally-supported roller mounted to be partially rotated and depressed by the passage of a can, a label-support having two inclines, and a pivotally-mounted paste-carrier disposed at the end of said support to be automatically actuated by the passage of a can, as set forth.

7. The combination of a label-support, a paste-carrier pivotally mounted at the end thereof to apply paste to the edge of the uppermost label on a pile, and means connected with the pivot of the carrier and extended parallel with the support to be engaged by a can to automatically actuate said carrier, as set forth.

8. The combination of a label-support, a wire disposed transversely thereof at its forward end and arranged above the labels, a spring-catch at the side of the said support, and an automatically-operated paste-applying device arranged to apply an adhesive substance to the label between said wire and the end of the support, as set forth.

9. The combination in a labeling-machine of means for applying a label, means for pressing the same against the can, means for applying a wrapper, means for folding the ends of the wrapper inward and devices for turning in the ends of the wrapper, as set forth.

10. The combination in a labeling-machine of means for applying a wrapper to a can, folding-wires for folding inward the ends of the wrapper and fingers for turning in the ends of the wrapper, as set forth.

11. The combination in a labeling-machine of folding-wires for determining the quantity in each fold of a wrapper, and fingers vertically disposed in a plane beneath said wires operating in conjunction therewith to turn in the folds determined by said wires, as set forth.

12. The combination in a labeling-machine with a label-support and the means for applying a label, of an oppositely-inclined runway for delivering the cans from the forward end to the opposite end of the machine, and an endless carrier disposed at substantially right angles to said runway for delivering the cans upon said support to be returned to the point from which they started, as set forth.

13. The combination in a labeling-machine with the guide-rails having depressions, of a pneumatic endless belt arranged to press upon cans as they move along said rails, and guide-rollers arranged to press upon said belt, as and for the purpose specified.

14. In a machine for labeling tins and other vessels, a pivotally-mounted roller for applying adhesive material, in combination with a series of small wires arranged parallel to and a short distance from the periphery of said roller, substantially as described.

15. In a machine for labeling tins and the like, a pair of pivotally-mounted arms, a roller mounted to revolve therein for applying adhesive material, and a series of small wires carried by the outer ends of said arms and arranged parallel to and a short distance from the periphery of said roller, substantially as and for the purpose specified.

16. In a labeling-machine, the combination with the guide-rails, of an endless pneumatic belt arranged to press upon the cans as they move along said guide-rails, as set forth.

17. In a labeling-machine, the combination with the guide-rails having depressions, of an endless pneumatic belt arranged to press upon the cans as they move along said rails, as and for the purpose specified.

SAMUEL FYFE.

Witnesses:
EDWARD WATERS,
EDWARD WATERS, Jr.